Figure 1:
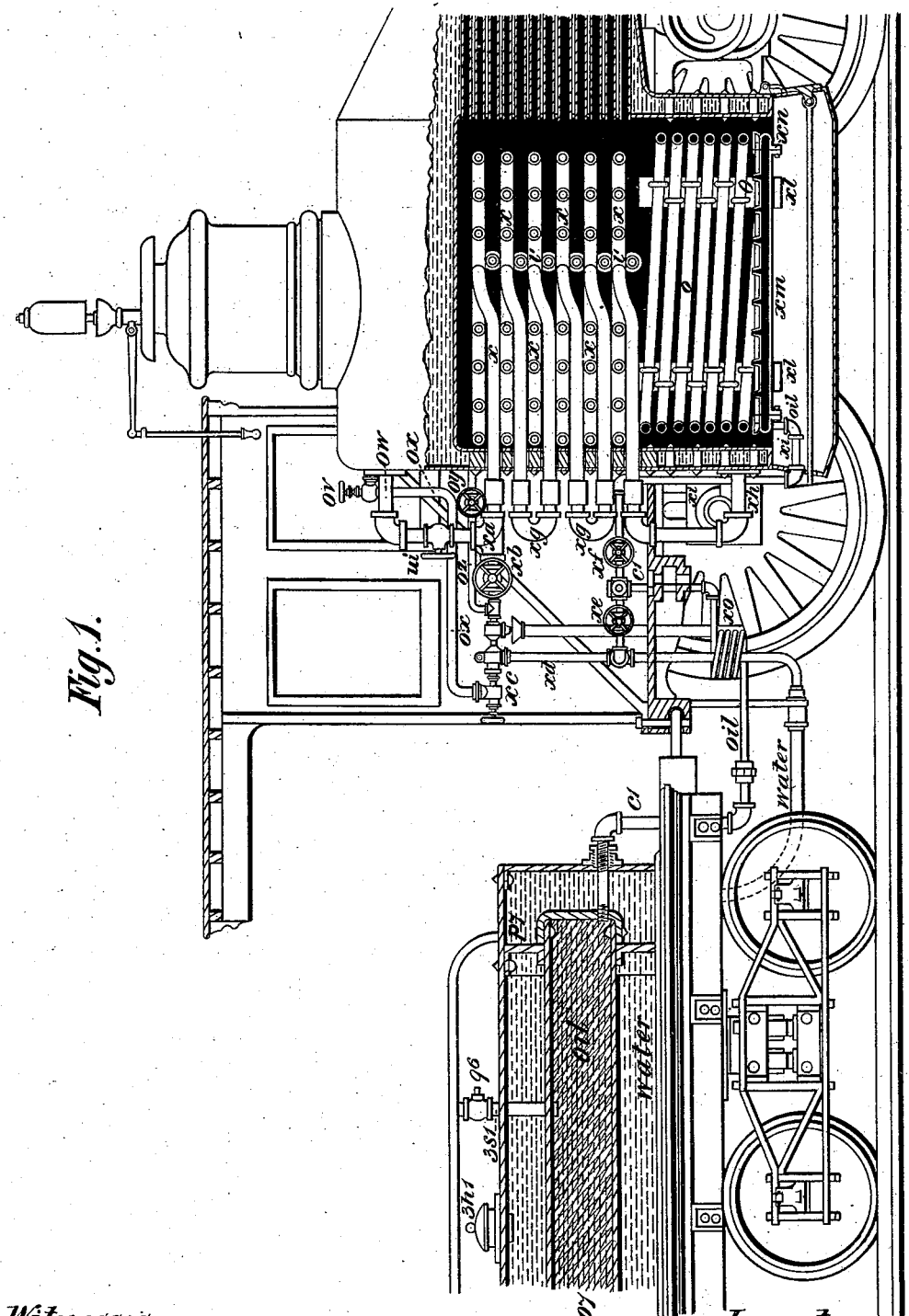

(No Model.) 7 Sheets—Sheet 1.

W. F. BROWNE.
APPARATUS FOR GENERATING GAS AND PROMOTING COMBUSTION.

No. 260,280. Patented June 27, 1882.

Witnesses:-
Robert Sylvain
E. H. Legrand

Inventor:-
Wm Frank Browne

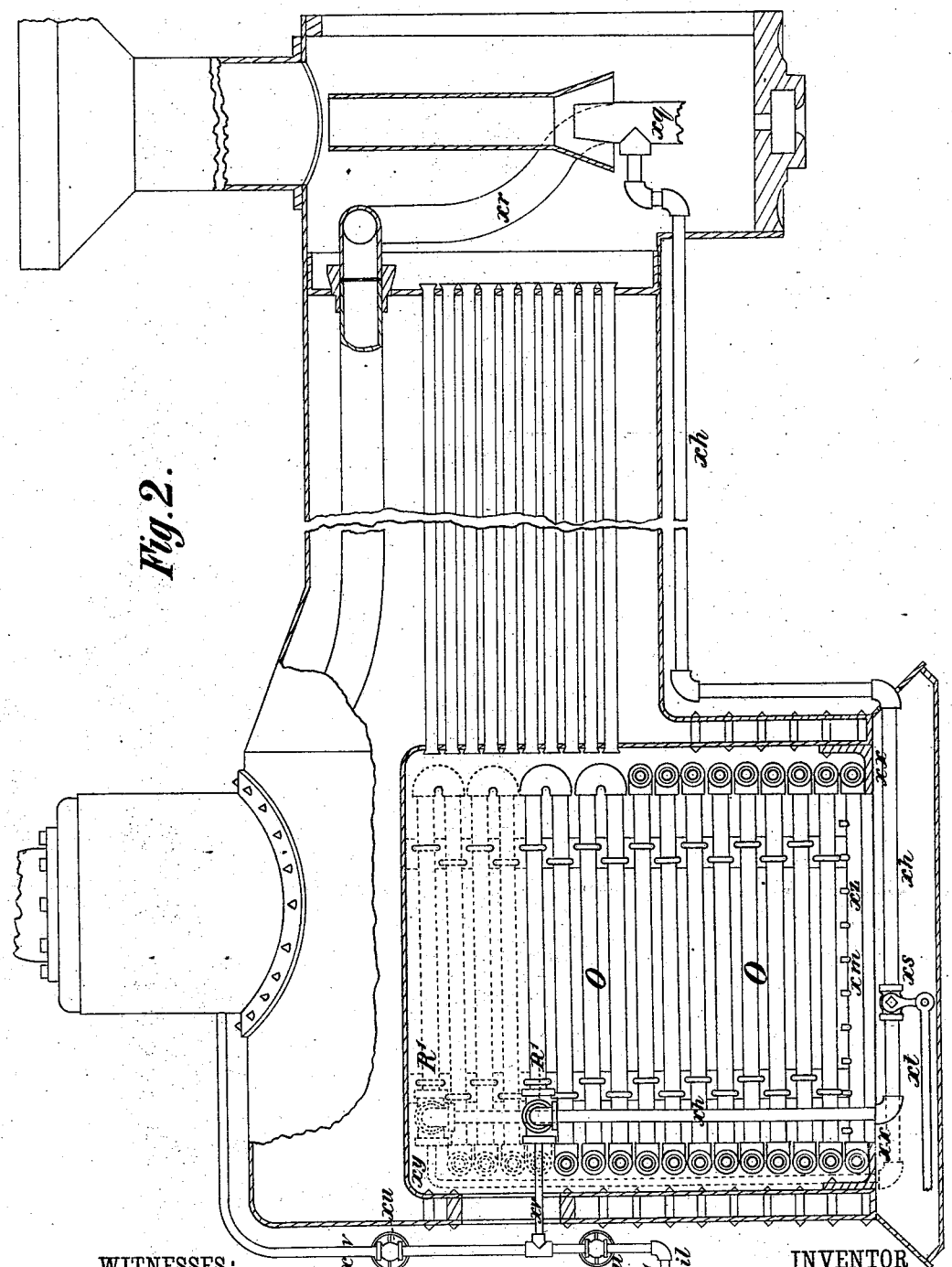

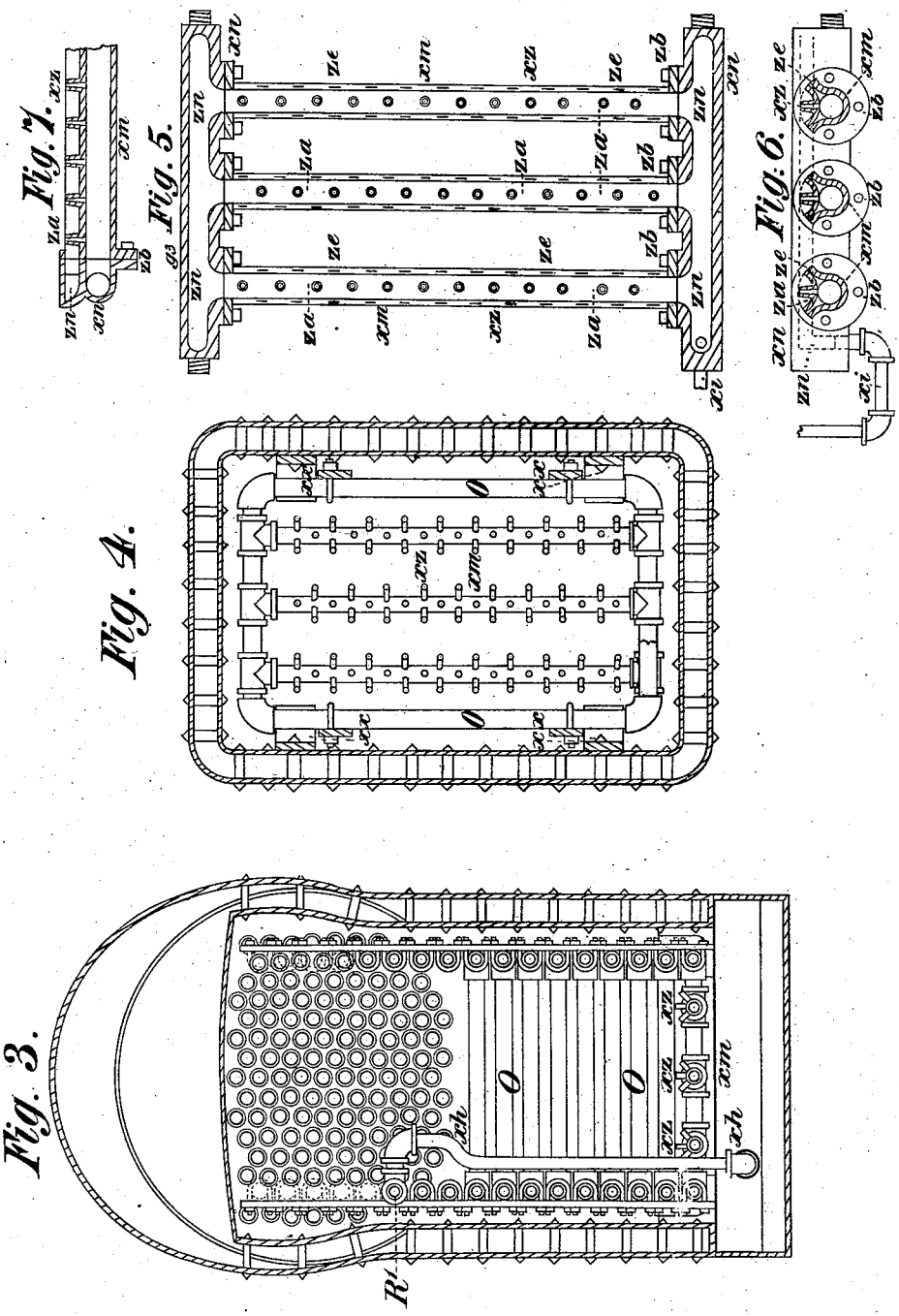

(No Model.) 7 Sheets—Sheet 4.
W. F. BROWNE.
APPARATUS FOR GENERATING GAS AND PROMOTING COMBUSTION.
No. 260,280. Patented June 27, 1882.
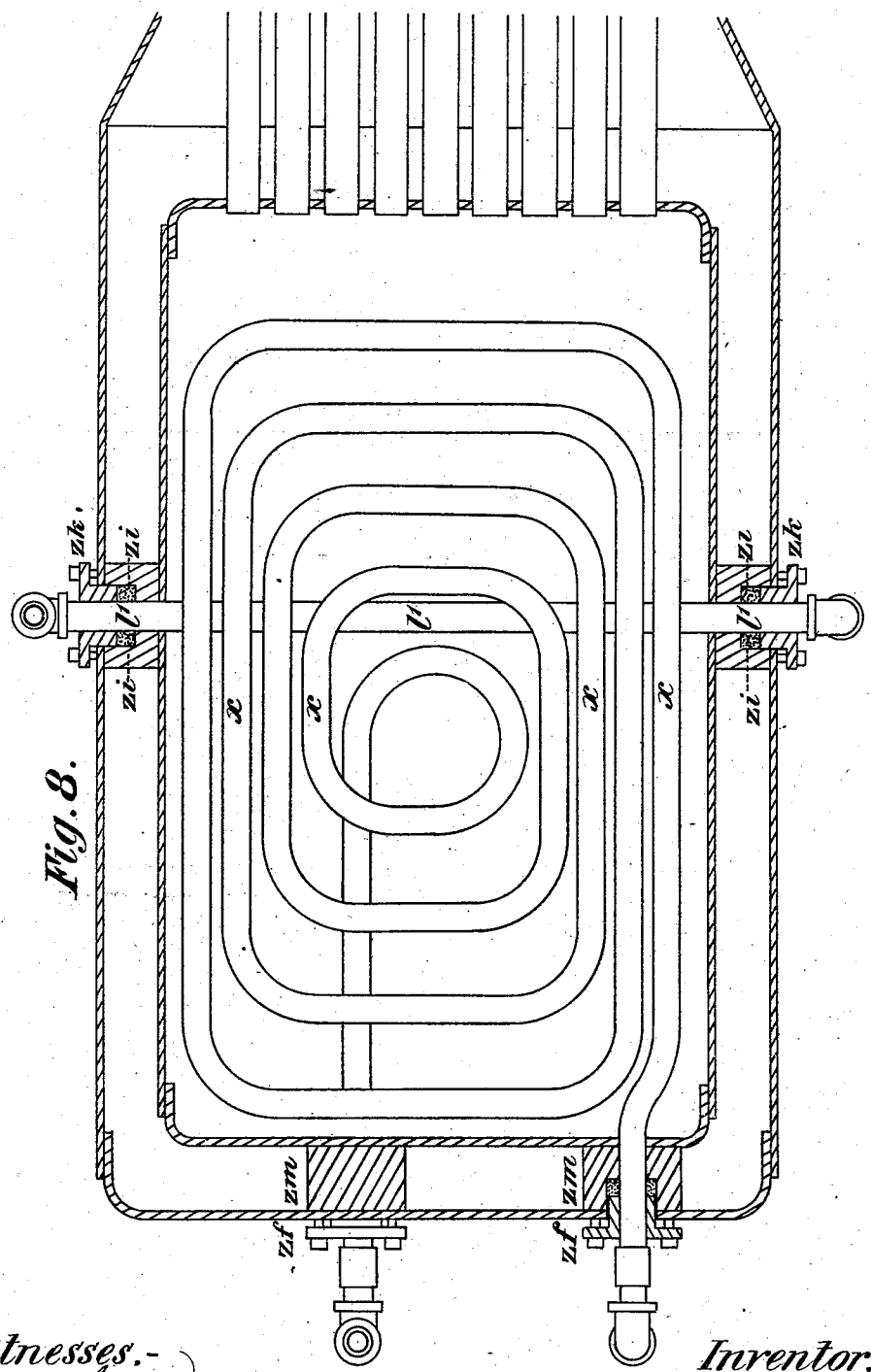
Witnesses.-
Robert Sylvani
E. A. Legrand
Inventor.-
Wm Frank Browne

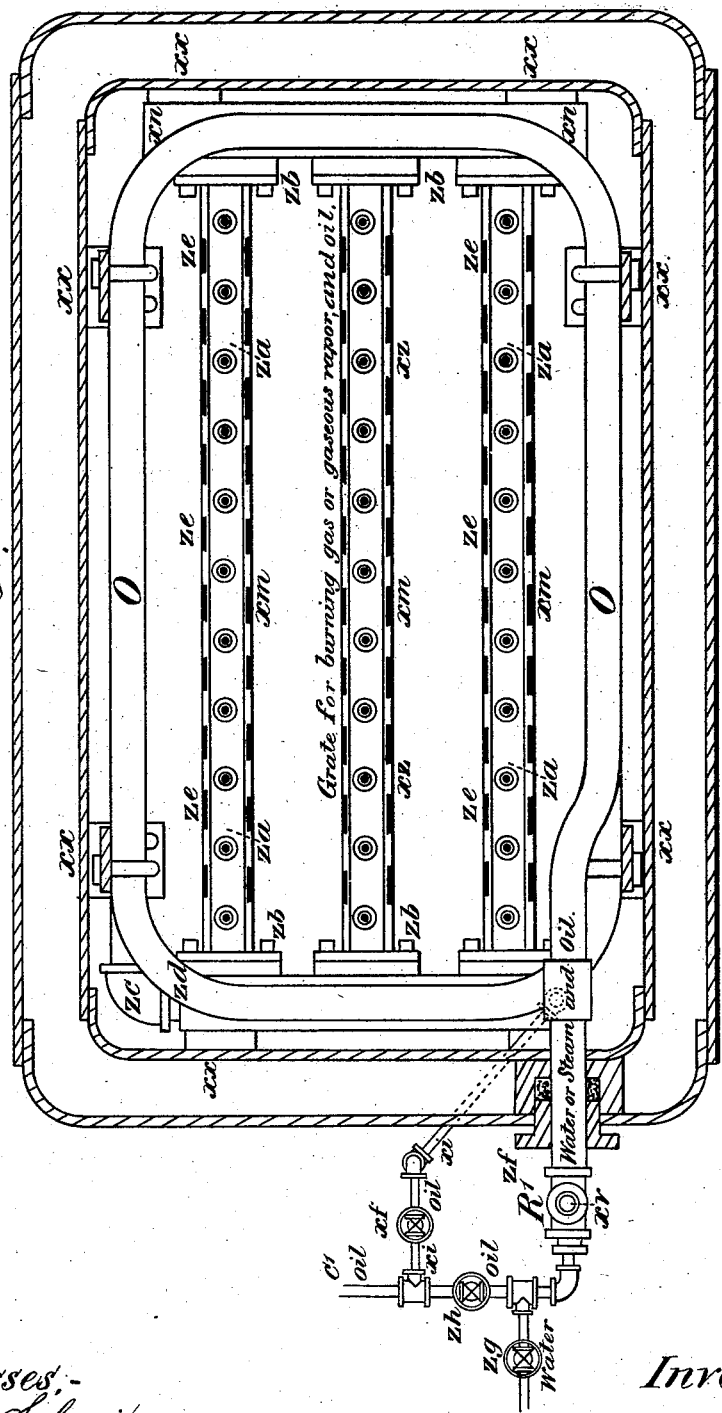

(No Model.) 7 Sheets—Sheet 6.

W. F. BROWNE.
APPARATUS FOR GENERATING GAS AND PROMOTING COMBUSTION.

No. 260,280. Patented June 27, 1882.

Witnesses:
R. Sylvani
E. A. Legrand

Inventor:
Wm Frank Browne (No Model.) 7 Sheets—Sheet 7.
W. F. BROWNE.
APPARATUS FOR GENERATING GAS AND PROMOTING COMBUSTION.
No. 260,280. Patented June 27, 1882.

Witnesses:
R. Sylvani
E. A. Legrand

Inventor:
Wm Frank Browne

UNITED STATES PATENT OFFICE.

WILLIAM FRANK BROWNE, OF NEW YORK, N. Y.

APPARATUS FOR GENERATING GAS AND PROMOTING COMBUSTION.

SPECIFICATION forming part of Letters Patent No. 260,280, dated June 27, 1882.

Application filed February 4, 1882. (No model.)

*To all whom it may concern:*

Be it known that I, WM. FRANK BROWNE, of the city, county, and State of New York, have invented certain new and useful improvements in apparatus for generating gas and promoting combustion and for increasing the heating-surface and for generating gaseous vapor in the furnaces of steam-boilers; and I do hereby declare that the following is a clear and full description of the same, reference being had to the accompanying drawings, which form a part of this specification.

This invention relates to apparatus for increasing the heating-surface of all classes of steam-boilers, and to the mode and apparatus for burning combustible liquids for generating a hydrocarbon gas, water-gas, and gaseous vapors in and for burning said hydrocarbon gas, water-gas, or gaseous vapor within the furnaces of said steam-boilers.

The invention consists, first, in arranging a suitable number of suitably-coiled pipes or conduits in the fire-box of a steam-boiler, and joining said coiled pipe or conduits by suitable end connections, whereby a free circulation of water is obtained and maintained between said coiled pipe or conduits and the boiler with which they are connected; second, in arranging a suitably-coiled pipe or conduit within the fire-box of a steam-generator, and in which a gas or gaseous vapor is generated for combustion within said fire-box; third, in a hollow grate provided with independent passages for the transmission of gas or gaseous vapor and combustible liquids, and suitable outlets thereto, through which said gas or gaseous vapor and combustible liquid escape into the fire-box, wherein they are burned.

The object of the invention is to increase the heating-surface of steam-boilers, and provide a gas or gaseous fuel of greater heating-power than is now obtained from solid fuels.

Heretofore several attempts, with various devices, have been made to generate a heating-gas or gaseous vapor within the furnaces or fire-boxes of the different classes of steam-boilers, and burn said gas or gaseous vapor within said furnaces or fire-boxes, for the purpose of generating said gas or gaseous vapor, and simultaneously therewith generate steam for motive power and other purposes. So far all of said devices have met with but a varying or partial success. The devices most commonly experimented with consist of a retort or retorts, generally made of cast-iron and in various forms. The form used in the experiments made by the within-named applicant was the D-retort, some of which were made of cast-iron and others of fire-clay. Into the iron retorts steam or water was forced, while hydrocarbon oils were forced into a separate retort, and from thence into the third retort, where they combined with the steam from the first retort, and from thence the gas or gaseous vapor was discharged into the furnace and burned; but the great obstacle to the success of the experiments in both the iron and clay retorts, which had an aggregate heating-surface of about fifty feet, was found to be that there was an insufficient heating-surface to properly decompose water or steam and hydrocarbon oils and make a gas therefrom, which would, on burning in the furnace, generate heat enough to make gas continuously. When water or steam and oil are fed slowly in the retorts a gas can be made by the employment of auxiliary heat, but in insufficient quantity to be used with economy when applied to the practical work of generating steam for motive power; or, in other words, the apparatus consisting of retorts cannot be self-sustaining and do the work required. Therefore all such expensive modes for economizing in fuel might as well be dispensed with.

One great obstacle to the success of clay and cast-iron retorts is the thickness of the walls through which the heat is transmitted, and when once highly heated and the interior thereof subjected to water or steam and hydrocarbon oils a sudden contraction of the interior metal or clay takes place, thus causing the retort to crack and leak in a very short time, thereby rendering it useless. Owing to the construction of the ordinary retort, the interior capacity or space thereof is far too great for the heating-surface. Consequently gas cannot be made in a retort in a sufficiently rapid and practical manner, so that when burned the heat generated therefrom will be sufficient to supply the loss from radiation and do the mechanical work of generating the gas for combustion, and at the same time generate steam for motive power which will be more economical than when said motive power is generated by the usual methods; and, furthermore, the retort which is placed within a furnace or fire-box of a steam-boiler cannot be greater than the length or width of said furnace. Ordinarily speaking, the greatest length would seldom exceed nine feet, and it will be barely possible to locate four retorts within said furnace which would have an aggregate length of thirty-six feet, and if a foot in width on the bottom and the retorts of the D form the internal heating-surface cannot be greater than eighty-six square feet. Therefore in order to make a heating-gas to generate itself and generate a surplus heat sufficient to generate steam for so large a boiler as the furnace would imply, the amount of water or steam and hydrocarbon oils necessary for the business would have to pass with such rapidity through the thirty-six feet of retorts that no decomposition could take place. The resultant mechanical mixture of steam, water, hydrocarbon vapor, and crude petroleum would be blown into the furnace, and with little result so far as heat is concerned. Therefore if three or four small retorts with an aggregate area of less than twenty feet should be adapted to a furnace of three feet in width, five feet in length, and five feet in height, or thereabout, in which heat is required to be generated to generate steam from one hundred and twenty-five to two hundred horse-power, the fallacy of the contrivance would be apparent to an observing inquirer after new ideas and the economical and practical results derived therefrom. Of course a gas can be made with such a device, which will be burned with a short, sickly, and flickering flame within the furnace in which the retorts are located; but the practical results thereof will be more clearly or better understood when practically applied to generate steam for a two hundred horse-motor.

To obviate the defects as above set forth the within-named applicant has by repeated experiments and at great cost succeeded in overcoming them, which is accomplished in part by a great increase in the heating-surface and a corresponding decrease in the capacity of the gas or gaseous generator.

This generator consists of a pipe, which of course will vary in length and diameter to correspond with the various furnaces in which it may be used. This pipe or conduit is made into a coil, either by bending or by elbows or return-bends; or it may be connected by some other analogous means which may be required to make the generator conform to the furnace. Water or steam and combustible liquids are forced into one end of the pipe or conduit by a pump or injector, and when the pipe or conduit is highly heated gas or a gaseous fuel will be discharged from the other end, which is connected to a hollow grate provided with suitable outlets for the discharge of said gas or gaseous vapor into the furnace, where it will be burned. The steam for the generator can be taken from the boiler, to inject the combustible liquid therein; and also, when the heat is great enough, water can be mingled with the combustible liquids, as will be hereinafter described, and forced by the steam-jet into the generator, where a decomposition of the mixture will be effected. The coiled pipe or conduit can be built up near to the inner walls of the furnace, and a furnace of about three feet in width, five feet in length, and five feet in depth will contain a coil of two hundred and twenty feet of two-inch pipe, the internal surface of which will measure one hundred and ten feet and the external surface thereof a fraction over one hundred and thirty-six feet. By means of this great heating-surface and the small capacity inclosed thereby gas can be made in a rapid and continuous manner, and under any pressure of steam which can be obtained within the boiler. This gas can be made under a pressure of one hundred pounds and upward and discharged into the furnace, thereby filling the furnace and the boiler-tubes full of flame, which will generate steam in a rapid manner. The quantity of gas can be increased or diminished simply by turning a valve.

Figure 10:
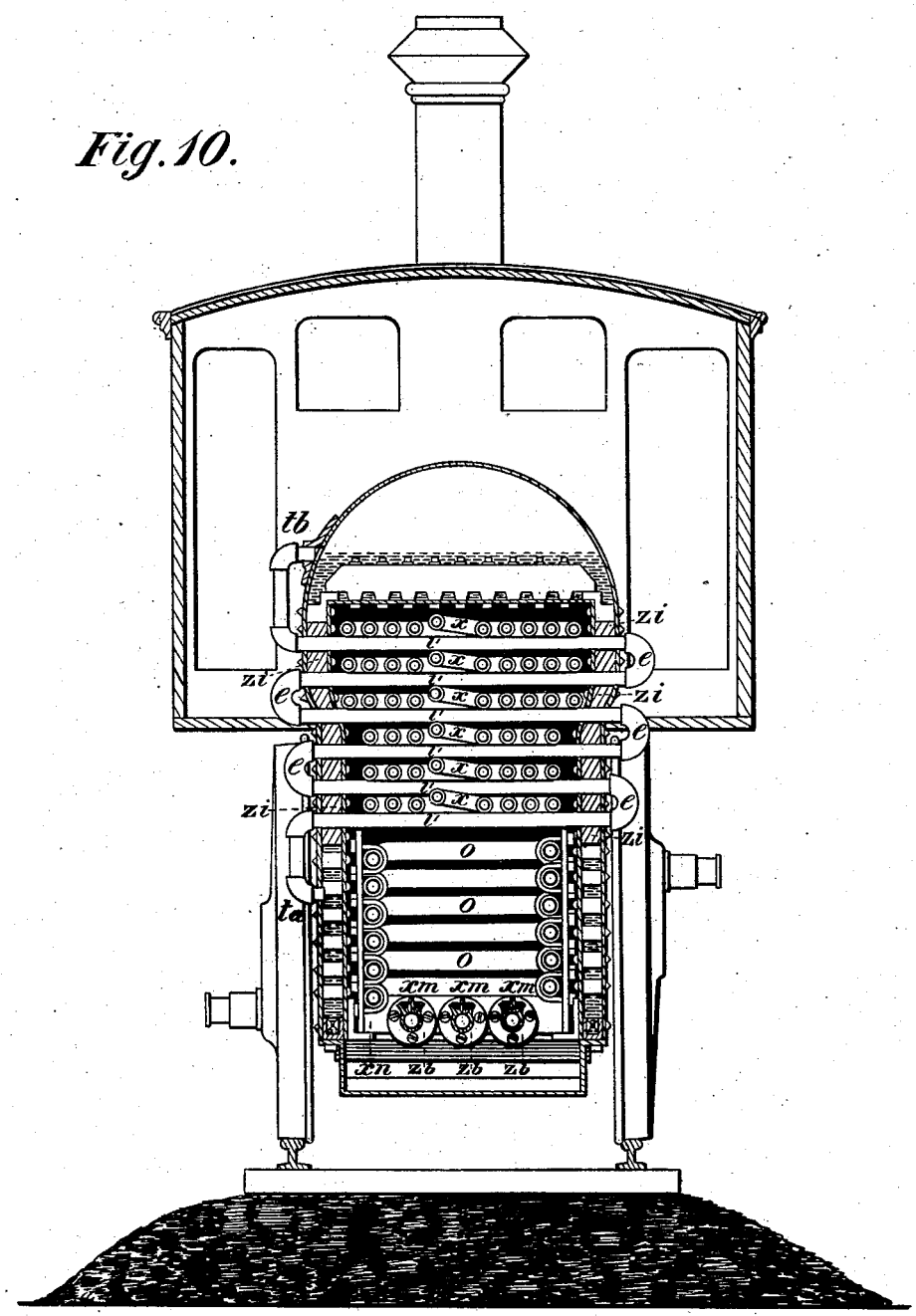
Figure 11:
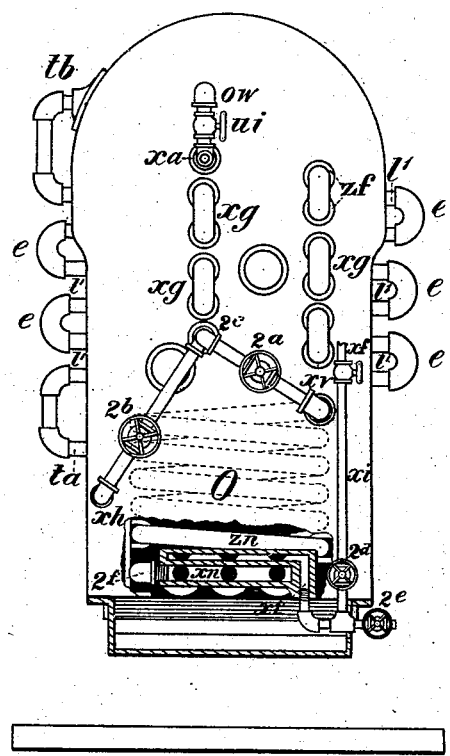

Figure 1 is a vertical longitudinal broken sectional view of a locomotive and tender, showing a coil in the fire-box for generating gases and the grate from which the gas or gaseous vapor is discharged, coils for increasing the heating-surface of the boiler and the connections therewith, and the tender which carries the fuel, water, and combustible material. Fig. 2 is a vertical longitudinal sectional view of a locomotive fire-box and boiler, showing the gas or gaseous-vapor generating coil located in the fire-box, and the connection with the exhaust-steam pipe or nozzle. Fig. 3 is a transverse section cutting through the fire-box of a locomotive, the gas or gaseous-vapor generator, and hollow grate. Fig. 4 is a horizontal section of a locomotive fire-box, cutting through said box below the boiler-tube, showing a plan view of a gas or gaseous-vapor generating coil and a hollow grate for discharging gaseous fuel therefrom. Fig. 5 is a detached plan view of a concave-faced tubular perforated grate from which combustible liquids and gas or gaseous vapor are burned. Fig. 6 is a cross-section of the concave perforated tubular grate-bars, showing the concavity of the upper surface, from which the combustible liquid is burned, and the perforations through which the gas or gaseous fuel is discharged, and the connecting-pipe for conducting the combustible liquid to the concave surface of the tubular grate-bars. Fig. 7 is a broken longitudinal section of one of the tubular grate-bars and one of the end headers to which the bars are attached. Fig. 8 is a horizontal section of a locomotive fire-box, cutting through the center of the tube-sheet. This figure shows a plan view of one of the sectional heaters for increasing the heating-surface of the boiler and the means for supporting said heater in the fire-box, and the exterior connection thereof for connecting the heater with a series through which water or steam circulates. Fig. 9 is a horizontal section of a locomotive fire-box, cutting through said fire-box below the boiler-tubes, showing a coiled pipe or conduit in which a gas or gaseous vapor is generated, and the plan view of a concave tubular perforated grate into which said gas or gaseous vapor is discharged, and from whence said gas or gaseous vapor is discharged through the perforation into the furnace, where it is burned, and the necessary connecting-pipes for conducting combustible liquids, water, and steam therein, for the purposes hereinafter set forth. Fig. 10 is a vertical transverse section of a locomotive, cutting through the fire-box and upper portion of the boiler, and showing a series of generating-coils located in the combustion-chamber for increasing the steam-generating surface in connection with the boiler, a series of circulating and supporting pipes for supporting the coils, and a coiled generator for generating a gas or gaseous vapor. Fig. 11 is the front end elevation of a locomotive furnace and boiler, showing the connection of the upper series of generating-coils with the lower generating-coil and tubular grate, the front header of which is shown in section through the broken water-leg.

Like letters and figures of reference designate corresponding parts in all of the figures.

The means herein shown and described for increasing the heating-surface of steam-boilers and for generating a gas or gaseous fuel to be burned within the furnace or fire-box of said boilers consists of a number of coiled pipe or conduits, $x$ and O. (Shown in Figs. 1, 2, 3, 4, 8, and 9.) The heating coils or conduits consist of a series of sectional generators located one above another, as shown in Fig. 1. These sections are or can be made in the form shown in plan view, Fig. 8; or they can be made in other suitable forms which might be required in adapting them to the various classes of furnaces used on land or in marine service; but for all ordinary boiler-furnaces the plan shown for constructing the sections is the cheapest and most easily constructed, and far less liable to get out of order than when constructed with many joints and fittings which come in contact with the fire. A round fire-box would require sections to be coiled in a spiral form, while a square furnace should be provided with a square coil, which can be coiled with the coils equidistant from each other. The bend of the pipe at the corners of the coil should be bent on the shortest radius possible without injuring the pipe. I have found it practical to bend a pipe one and one-fourth inch internal diameter on a radius of four inches, one and one-half and two inches on a radius of five and six inches. A two-inch pipe will be large enough to construct a coil from for an ordinary boiler not exceeding five hundred horse-power. The number of sections will be limited by the depth of the fire-box and the length of the pipe from which they are made by the area of the grate-surface; but where it is practicable to adapt two or more of them a great increase of steam-power will be obtained when a gas-flame is employed, for the reason that the high-pressure gas-flame which will be produced will fill the entire fire-box and afford a complete combustion, the heat of which will be intense. All of the sections $x$ should be made from one pipe or conduit, which should be composed of double extra pipe, firmly welded together into the required length prior to forming the sections. The two ends of the sections should project through the shell or water-legs of the furnace and be provided with return-bends or special fittings $x\,g$, whereby they will be connected and form a continuous free passage for the circulation of water. The two opposite ends of the combined sections should terminate as far below and above the water-line as would be necessary for obtaining a positive circulation of the water. These sections are supported by the two projecting ends which project through the walls of the furnace, and by a supporting pipe or tube, $k$, which extends across the furnace and through the walls thereof, where they are united by return-bends, thus forming a continuous conduit, the two ends of which are connected to the boiler above and below the water-line for the purpose of a free circulation of water through the said conduit. This circulation will prevent the pipe from getting red-hot, whereby the strength will be retained and afford a complete support for the sections of conduits which rest thereon. These sections can be used for heating water by natural circulation; but when necessary the sections can be used as an independent steam-generator simply by closing controlling-valves $o\,y$ and opening controlling-valves $x\,b$, and forcing water by the injector $x\,c$ from pipe $x\,d$ by steam derived from the boiler on opening controlling-valve $o\,v$, from whence said steam is conducted through pipe $o\,x$ to said injector. The water now passes into the upper conduit, $x$, and circulates downward through the series, from whence it is discharged into the water-leg of the boiler; or the water can be discharged through a connecting-pipe into an independent separator, from which the steam can be conducted to whatever place desired. All of the feed-water can at first be transmitted through the series of sections prior to entering the boiler. These sections can also be employed to generate a gas or gaseous vapor from water and combustible liquids. This gas can be generated for both heating and illuminating purposes. The water would be forced in as above described, or by a pump. The combustible liquids could be drawn into water-pipe $x\,d$ from pipe $c'$ on opening controlling-valve $x\,e$, and forced, in combination with the water, into said sections, wherein it will become decomposed and a fixed gas formed, which could be forced by its generative force to any point required; or a gaseous vapor can be formed and discharged into the furnace and burned; and also the gas can be forced through the superheater and therein fixed; or a fixed gas can be formed in the sections while a heating-gas is being made in the heater O, and discharged into the furnace for combustion. This arrangement would be a desirable feature in a factory where illuminating-gas is required or at any point where said gas is wanted. This gas could be generated on locomotives, and the gas compressed into suitable holders by the pressure from the generative force of the gas, and subsequently used on the train for illuminating purposes; and also gas-holders can be located about a depot, and filled by the above-described means.

When the sectional generators are used as circulators, valve $u\ i$ on discharge-pipe $o\ w$ must be opened and valve $x\ b$ closed, thus allowing a free circulation through pipe $x\ h$ and the sections $x$ into the boiler through pipe $o\ w$, while the feed-water will be discharged through pipe $o\ z$ on opening valve $o\ y$. The cross-pipes $l'$ can be connected with the sections $x$, and water forced through the combination by the injector or by a pump; or said pipes can be fed independent of the coiled sections.

Whenever the walls of the furnace consist of a double shell with an air or water space between them, supporting-standards $z\ m$ and $z\ i$, Fig. 8, should be placed in said space and riveted water-tight to the outer and inner shells. This supporting-standard should be long enough to include all of the supporting-bars $l'$ and the coiled sections $x$ and the upper turn of the superheating-coil O, as shown in Figs. 1, 8, and 9. These supporting-standards should be provided with holes corresponding with the terminal ends of the heating-sections $x$, supporting-pipes $l'$, and the upper end of the superheater O, through which all of these ends project. A stuffing or packing box, $z\ t\ z\ k$, is provided for each hole and pipe for the purpose of preventing the escape of heat around the projecting ends of the pipes.

The superheating-coil or gas or gaseous-vapor generator can be made from suitable pipe, which should be welded together in suitable lengths to form the heater or generator, without joints occurring in the fire-box. These coiled heaters or generators should be constructed so as to admit of from one to two inches of clearance between the walls of the fire-box and the coil for the purpose of allowing staples or grips to be placed on each turn of the pipe, and then properly secured to a strap and nut at the back of the coil in the space above alluded to, and also this space admits of free circulation of flame about the back of said coil. Whenever the furnace or fire-box is polygonal in form the pipe forming the coil should be bent on a radius at the angles of said fire-box of sufficient length to admit of the pipe being bent without splitting, breaking, or flattening. A circular fire-box should be provided with a circular coil. These coils can be made in the manner shown in Figs. 2, 3, and 4, which is done by cutting pipe into suitable lengths and connecting them by elbows and return-bends, as shown. These coils can be built up to the crown-sheet when necessary to obtain or generate a great amount of gas or gaseous fuel.

In the case of a locomotive or other boiler, where the tube-sheet is below the crown-sheet, it will be necessary to build the generating-coil O upon three sides of the furnace, above said tube-sheet, in order to avoid obstructing the entrance of the flame into the tubes. Consequently return-bends, as shown, are best adapted to form a proper coil of this construction; but when the coil is made as shown in Figs. 1 and 9 it will necessarily be limited to such form by the tube-sheet, after which it can be continued by the use of return-bends and elbows to the crown-sheet in the manner shown in Figs. 2 and 3. This coil is supplied with combustible liquid through pipe $c'$ and controlling-valve $x\ u$, from whence it is drawn through connecting-pipe $x\ v$ by injector R', (see Figs. 2 and 9,) from whence it is forced into the generator O, and through which it circulates and becomes highly heated on its passage downward to the perforated tubular grate, from whence it is discharged into the furnace in the form of a fixed inflammable gas or gaseous vapor.

The motive force for drawing and forcing the combustible liquid is derived from the exhaust-steam, which is conducted from the exhaust-nozzle $x\ q$ by pipe $x\ h$, the upper end of which connects with the injector R'. The vertical rim of this pipe can pass between the wall of the furnace and the coil, as indicated by dotted lines. The steam is controlled by valve $x\ s$ and operating-lever $x\ t$.

The motive force can be taken directly from the boiler through pipe $x\ v$ and controlling-valve $x\ u$, thence through injector R'. In case steam is taken directly from the boiler, the injector should be upon the outside of the furnace, as shown at $x\ c$, Fig. 1, or R', Fig. 9.

The steam for the motor or motors of the locomotive is derived through pipe $x\ r$, the exhaust of which is forced through ejecting-nozzle $x\ q$ against a back-pressure of twenty pounds and upward, and with a degree of heat but little less than when it left the boiler. This pressure and heat can be utilized to a certain extent—that is, it is practicable to use enough of it to force the combustible liquid into the coiled generator, the steam supplying its due proportion of gas-making material. As the exhaust-steam is a waste product, a saving of force, material, and heat is effected. Of course the exhaust-steam will be far more than will be required for generating a gas or gaseous fuel when said fuel is made for a locomotive. The surplus steam will of course escape through the stack in the usual manner, and cause a sufficient draft to form a complete combustion with the gas or gaseous fuel in the furnace.

The heat which is derived from the exhaust-steam in the generating-coil is a saving of the amount of fuel required to generate the steam at the degree of heat which it retains when entering said generating-coil; or, in other words, if one-tenth part of the exhaust-steam of a twohundred-horse motor should be forced through the coiled generator, a saving of the amount of fuel required to run a twenty-horse engine would be effected.

The grate which is shown in Figs. 2, 3, and 4 is made of pipe and fittings. The upper surface of the bars $x\,m$ is provided with a suitable number of perforations, which may be drilled at any suitable angle to the plane of the grate. The holes or perforations can be provided with nipples or burners $x\,z$, through which the gas or gaseous vapor will be forced. As the gas or gaseous vapor will be made under high pressure, and the area of the bore of the burners will be made in accordance with the diameter of the pipe forming the superheater, a high pressure can be obtained and maintained continuously. This gas or gaseous vapor will discharge itself with such force that it will project itself against the crown-sheet, from whence it will reverberate and fill the fire-box entirely full of gas-flame, which will force itself through the tubes and stack, if necessary.

The quantity of gas made will depend upon the material and pressure. I find by experience that it will be practicable to discharge at least from a heater made of two hundred and twenty feet of double-extra pipe two inches in internal diameter, under fifty pounds' pressure, one hundred and thirty thousand cubic feet per hour, which, when applied to a locomotive-boiler of two hundred horse-power, is more than will be required. Therefore the size of the heater and the pressure can be varied according to the power required. The upward current formed by the jets issuing from the perforations or burners will assist very materially in inducing a draft of air for combustion; and, also, I find by experience that it is not necessary to adapt a multitude of jets to the area of the fire-box in order to obtain a proper mixture of air. Such contrivances are expensive and of no material advantage when compared with gas forced under high-pressure in contact with the required amount of air derived from the incoming draft which is induced by either drawing or forcing devices.

This mode of generating gas under high pressure and in great quantities cannot be done in what are commonly called "retorts," which are always constructed with great capacity and small heating-surface in comparison therewith. The gas is generally made under low pressure, which is usually obtained from a hydrostatic column of but a few feet. With this low pressure in the retort the absorption of heat is very slow, from the fact that all rarefied bodies absorb heat slowly, or generally in accordance with their density. Therefore for this reason alone it is impossible to make gas in a retort under low pressure, and thereby furnish fuel enough to generate the gas and still retain a supply of heat sufficient to generate steam for continuous and practical work. Therefore in order to effect a practical result the area of the transverse section of the retort must be reduced to the smallest practicable capacity, while the surface must be increased to its greatest practicable extent. Such is the case with the generator herein shown and described, with the additional feature of generating the gas or gaseous vapor under very high pressure, which, when under high pressure, absorbs and transmits heat in a more rapid manner than under the low pressure spoken of above, in consequence of which a gas or gaseous vapor can be made with far greater rapidity and volume than when done in any other manner. This increase of absorption by pressure is an important factor in making gas, and especially so when made in connection with furnaces for generating steam and for other uses.

The coiled generators are supported in the furnaces by brackets $x\,x$ or by some other suitable contrivance. The coiled generator O is connected to one of the headers of the grate by an elbow-fitting, as shown in Fig. 4. The three grate-bars $x\,m$ connect with this header, and are supplied with gas or gaseous vapor therefrom.

The grate shown in Figs. 1, 5, 6, 7, and 9 is made in sections and of cast-iron. The two headers $x\,n$ are made tubular in form, one or both of which are provided with an auxiliary passage, $z\,n$, on the top thereof. This passage communicates with a supply-pipe, $x\,i$, while the passage $z\,n$ is provided with three outlets which communicate with three corresponding open channels. This arrangement is for the purpose of supplying the grate with combustible liquid prior to generating gas or gaseous vapor in the heater O. The liquid is introduced by pipe $x\,i$ into a covered channel, $z\,n$, from whence it is distributed over the grate-bars. Steam can be forced through pipe $x\,i$ into the passages $z\,n$, should they become clogged, thereby clearing them out.

The bars $x\,m$ are provided with flanges $z\,b$, which fit corresponding flanges on the two headers, and to which they are bolted. Projections $x\,z$ can be cast with the bars in the channel $z\,a$, with holes therein for the eduction of gas or gaseous vapor. The edges of the channels are provided with outlets $z\,e$ for the eduction of gas or gaseous vapor. These outlets can be made in any form desired. The form shown will cause the gas to rise and force a flame the entire length of the bar. These jets can rise from the bar at any angle desired, and in a manner that will create an upward current of air and cause it to be mingled therewith. This grate is shown in connection with the gas or gaseous-vapor generating coil, Fig. 9. The terminal end of the coil is connected with the front header by means of elbow and nipple $z\,c$; or it can be connected in any other suitable manner.

The heating or generating coil O is supplied with water or steam and combustible liquid at its upper end by means of injector R', or by a pump or other forcing device. This injector can be supplied with steam directly from the boiler through pipe $x\,h$. When the device herein shown and described is used in connection with a locomotive the water and combustible liquid can be carried on the tender in any suitable manner. The plan herein shown is well adapted for the purpose. The combustible liquid is run into a tank, $o\,7$, on opening valve $9\,6$, through pipe $3\,s\,1$, while the surrounding chamber or space is filled with water by removing plugs $3\,h\,1$. The tank $o\,7$, which holds the combustible liquids, is kept in position by suitable division-plates, $p\,7$. Pipe $c'$ connects with the tank and conducts this liquid to the points required.

For a more complete description concerning the method of carrying combustible liquids on the tender of a locomotive and in ships, see applicant's application entitled "improvements in motive power for land and water transportation," marked "Case H," filed December 22, 1881, No. 48,492.

Pipe $c'$ is provided with a coil, $x\,o$, which consists of a suitable number of turns and of suitable diameter. This coil is for the purpose of forming a flexible and yielding connection between the locomotive and tender, and at the same time conducting the combustible liquid from the tender to the points required on said locomotive. The coil can be placed beneath the connecting-link, where it will be in the center of motion. This feature of a spring-coil can be applied to many places where movement is required for conducting steam, water, &c., where at present flexible hose or rubber tubing is used. They can be constructed and attached to permit of lateral, oblique, or vertical movements.

In the sectional view, Fig. 10, the coils $x$ are supported in the furnace or combustion-chamber by means of the supporting-pipes $l'$, which extend across the furnace and project through the walls thereof at a suitable distance, where they are connected by suitable end fittings, $e$, for the purpose of forming a continued passage through the series. The lower end of this coil of circulating-bars is connected with the water-leg at $t\,a$, while the upper end is connected at the water-line or in the steam-space in the boiler at $t\,b$, whereby a constant circulation of water through the coil is obtained while there is heat within the furnace. A longitudinal sectional view of the supporting-standard $z\,i$, through which the supporting-bars project, is shown.

The gaseous-vapor-generating coil O is shown in section, and also the tubular grate-bars $x\,m$, with flanges $z\,b$ connecting the bars to the header $x\,n$. The two ends of each of the coils $x$ project through the front end of the boiler, where they are connected by suitable end connections, $x\,g$. (Shown in Fig. 11.) One end of the upper end of the upper coil $x$ is connected with the steam-space in the boiler at $o\,w$, while one of the ends of the lower coil $x$ is connected with the water-leg at $x\,h$ and the lower coil O at $x\,v$. The connecting-pipes are provided with valves $2^a$ and $2^b$, while the upper connecting-pipe, which connects the upper coil with the steam-space, is provided with a valve, $u\,i$. When the series of coils $x$ are used as circulators for increasing the power of the boiler, valve $2^a$ must be closed, while valves $2^b$ and $u\,i$ must be opened. The water will now pass from the water-leg at $x\,h$ through the series of coils and be discharged therefrom into the steam-space at $o\,w$; but when the boiler is to be fed with water through the said series of coils valve $u\,i$ must be closed and the water forced into the upper coil at $x\,a$, whence it will circulate downward and be discharged into the water-leg at $x\,h$. When the series of coils $x$ are to be employed in making a gas or gaseous vapor in connection with the lower coil O, valves $2^b$ and $u\,i$ must be closed and valve $2^a$ opened, after which water and combustible liquids can be forced into the upper coil $x\,a$, and thence circulate downward through the series and be discharged from thence into the lower coil O at $x\,v$, from whence they circulate downward and are discharged into the front header, $x\,n$, which is connected to the lower end of the coil by elbow and nipple $2^f$.

The upper passage, $z\,n$, in the header is for conducting combustible liquids from pipe $x\,i$ to the grate-bars shown in Fig. 9. The valve $x\,f$ is for controlling the supply of liquid fuel, while valve $2^d$ can be a check-valve or a suitable contrivance to prevent an overflow of the liquid fuel from the grate-bars. The valve $2^e$ is for draining the pipes and header when necessary. The cross supporting-pipes $l'$ are shown terminating in fittings $e$, while the two extreme ends of the coil terminate in the water-leg at $t\,a$ and steam-space at $t\,b$. The packing-rings, which form a tight joint, and the projecting ends of the coils, are shown at $z\,f$. The packing-rings for the cross-pipe $l'$ are shown in Fig. 8.

The modifications of the herein-described devices are numerous, but all subject to the main principles involved in the invention. The water, steam, and combustible liquids can be forced into the gas or gaseous-vapor generator by various means which can be combined in different ways. The water for the gas-generating coil can be taken directly from the boiler by means of a small pipe connecting with said boiler below the low-water line. The water which will pass through this pipe can be controlled by a suitable valve. The induction of water into the coiled generator can be through a suitable injector which would draw and force combustible liquids along with it; and, furthermore, this jet of water can be taken from the coils $x$, which will perform a similar function. One or more of the lower turns of the generator for generating gas or gaseous vapor can be perforated and the gas discharged therefrom into the furnace.

The heating and circulating coils $x$ should be made in such manner that they can be easily taken out and replaced when necessary. Those shown in Figs. 1 and 8 are made several inches shorter than the fire-box, so that they can be moved back against the tube-sheet, thereby relieving the connecting ends, which project through the walls of the fire-box, by retracting them within the box and allowing them to be removed through the bottom of the furnace. When these coils are removed it will be necessary to remove the supporting-pipes $l'$ by disconnecting the return-bends on the outside of the furnace and drawing said supporting-pipes out, thus relieving the coil.

The generating-coil O should be made as described, and connected to the injector by a nipple, which passes through the walls, and a right-and-left coupling within the furnace, as shown in Fig. 9.

Heating-coils might be placed in the smoke-box of a locomotive and attached to the back tube-sheet, whereby a circulation through the pipe would be established, thereby arresting some of the heat which is projected into the smoke-box; and, also, the feed-water can be forced into these pipes and from thence into the boiler.

A grate provided with a number of jets can be used, if necessary. Such grates are expensive and cumbersome, and when subjected to the movement and incessant jar and clatter of a locomotive fire-box their usefulness will cease in a short time; and, furthermore, where a multitude of small jets protrude through a corresponding number of small openings arranged in a plate which covers the entire area of the fire-box, minus said openings, a sufficient draft cannot be induced by discharging gas from "tubulures" under low pressure, for as the gas is supposed to contain a great amount of hydrogen it will require for perfect combustion from fifteen to twenty times its bulk in air. Therefore with gas issuing in jets under low pressure it will, when depending on this source alone, be impossible to draw air enough into the furnace to form complete combustion. Although the products of combustion escaping from the stack may not be seen, that does not prove that there are no free hydrogen and carbonic oxide, which are of themselves colorless gases, escaping with said products of combustion. With my device the entire area of the furnace is left open, minus the device, which is necessary for conducting and properly distributing the gases over the area, and through the entire fire-box and flues leading therefrom when necessary. The high velocity and manner in which the high-pressure gas or gaseous vapor is discharged into the fire-box will have a tendency to draw air into the fire-box with it; but this source alone should not be depended upon in all cases, especially for a locomotive where the capacity of the fire-box and boiler is limited. Artificial means for obtaining the draft must be resorted to, as is now done by the exhaust-steam or as can be done by other means.

The ash-pan, with its two adjustable end gates or dampers, should be retained, as shown in Figs. 1 and 2, for when the locomotive is in motion, with one of said dampers open, a current of air will be forced in, which will, under some conditions, be sufficient to form complete combustion with the gases in the furnace.

I do not limit myself to less than the maximum amount of tubular grate-bars consistent with a minimum amount of area for draft, nor to the minimum amount of grate-bars to the maximum amount of area for draft. In practice the mean should be adopted. The heat can be very easily controlled by the engineer when running his locomotive, the draft being controlled by the dampers at the ends of the ash-pan, while the combustible liquids and steam are controlled by opening and closing the proper valves. Sight-holes should be formed in the shell or wall of the furnace, so as to enable the engineer to observe and control the flame.

What I claim, and desire to secure by Letters Patent, is—

1. The process of generating gaseous vapor and supplying heat to the steam-boiler of the locomotive, which consists in injecting oil by a jet of steam under high pressure into and through a heated coil arranged around the sides of the fire-box, and discharging the gaseous products of their decomposition directly into the fire-box, and there causing their combustion by a suitable supply of air.

2. In a device for heating steam-boilers, a steam-supply pipe, an injector, and an oil-supply pipe connecting therewith, in combination with a coil-generator located in the fire-box of the boiler, and a suitable perforated grate for burning the gaseous vapor generated in the coil-generator.

3. In a device for heating steam-boilers, a steam-supply pipe connecting with the exhaust-pipe of a locomotive-engine, and with the injector, in combination with an oil-supply pipe, the injector, and the coil-generator within the fire-box.

4. In a device for heating locomotive steam-boilers, the oil-tank adapted to be carried by the tender, and the oil-supply pipe therefrom, having a spring-coil for permitting lateral movement, and the water and steam pipes, in combination with the gas generating and heating device in the fire-box of the boiler.

5. A water heating and circulating device consisting of a series of coils located in the fire-box of the boiler, and connected above and below the crown-sheet therewith, in combination with the coil gaseous-vapor generator, also located in the fire-box, and suitable connections, substantially as described.

6. A water heating and circulating device consisting of a series of coils located in the fire-box of a steam-boiler, and having external circulating connections and their supporting-standards, the said coils being adapted to sustain the gas-generating coils, and connecting with the boiler below and above the water-line, substantially as described.

7. A water heating and circulating device consisting of a series of coils located in the fire-box of the steam-boiler, and having external circulating connections and their supporting-standards and cross-supporting circulating-pipes, which are adapted to sustain the gas-generating coils, and connecting with the boiler below the water-line, in combination with an injector connecting therewith for supplying water to the boiler.

8. In a device for heating steam-boilers, a burner-grate composed of tubular headers, and connecting tubular perforated grate-bars provided with open channels in their upper surfaces, in combination with an oil-supply pipe opening into the channel.

9. In a device for heating steam-boilers, a burner-grate composed of tubular headers, and connecting tubular perforated grate-bars, provided with open channels in their upper surfaces, in combination with a gas-supply pipe connected to the tubular headers and bars, and an oil-supply pipe opening into the channels.

10. In a device for heating steam-boilers and heating and circulating liquids, the supporting-standards $z$ $m$, extending vertically between the outer and inner shell of the boiler of the fire-box, and provided with suitable openings and packing-boxes for making a tight joint around the pipes which extend through the shell and standards, substantially as shown.

11. In a device for heating steam-boilers, the generating-coils extending around the four sides of the fire-box from near the bottom thereof up to the lower tubes of the boiler, and then extending backward and forward around three sides of the box to the desired height, whereby the passage between the box and tubes is left unobstructed for the passage of flame and hot products of combustion into the tubes of the boiler.

12. In an apparatus for generating gas or gaseous-vapor fuel, the process of forcing combined combustible liquid and water together into a heated coil or coils arranged in the fire-box, and discharging the gaseous products of their decomposition directly into the fire-box, whereby a complete combustion is effected in the manner set forth.

WM. FRANK BROWNE.

Witnesses:
R. D. O. SMITH,
J. C. TURNER.